US012068099B2

(12) United States Patent
Saito et al.

(10) Patent No.: US 12,068,099 B2
(45) Date of Patent: Aug. 20, 2024

(54) COIL COMPONENT

(71) Applicant: TDK CORPORATION, Tokyo (JP)

(72) Inventors: Masataro Saito, Tokyo (JP); Masazumi Arata, Tokyo (JP); Hokuto Eda, Tokyo (JP); Kohei Takahashi, Tokyo (JP); Takamasa Iwasaki, Tokyo (JP)

(73) Assignee: TDK CORPORATION, Tokyo (JP)

(*) Notice: Subject to any disclaimer, the term of this patent is extended or adjusted under 35 U.S.C. 154(b) by 384 days.

(21) Appl. No.: 17/109,426

(22) Filed: Dec. 2, 2020

(65) Prior Publication Data

US 2021/0166859 A1 Jun. 3, 2021

(30) Foreign Application Priority Data

Dec. 3, 2019 (JP) ................................ 2019-218754

(51) Int. Cl.
*H01F 27/28* (2006.01)
*H01F 27/24* (2006.01)
*H01F 27/29* (2006.01)

(52) U.S. Cl.
CPC ......... *H01F 27/2804* (2013.01); *H01F 27/24* (2013.01); *H01F 27/29* (2013.01); *H01F 2027/2809* (2013.01)

(58) Field of Classification Search
CPC ...... H01F 27/2804; H01F 27/24; H01F 27/29; H01F 2027/2809; H01F 27/255; H01F 27/292; H01F 27/327; H01F 5/04; H01F 5/00; H01F 17/0013; H01F 2017/048
See application file for complete search history.

(56) References Cited

U.S. PATENT DOCUMENTS

2007/0040163 A1* 2/2007 Okuzawa .............. H01F 27/292 257/31
2009/0322458 A1* 12/2009 Lee ..................... H01F 17/0006 335/299
2012/0112869 A1* 5/2012 Nishikawa .......... H01F 17/0013 336/200
2013/0234820 A1* 9/2013 Yoo ..................... H01F 17/0013 336/200
2013/0314189 A1* 11/2013 Okumura ............ H01F 17/0013 336/192
2014/0077914 A1* 3/2014 Ohkubo .................... H01F 1/06 75/255

(Continued)

FOREIGN PATENT DOCUMENTS

CN 104078192 A 10/2014
CN 105655101 A 6/2016

(Continued)

*Primary Examiner* — Mang Tin Bik Lian
(74) *Attorney, Agent, or Firm* — Oliff PLC

(57) ABSTRACT

In a coil component, a first planar coil and a second planar coil are wound around a common magnetic core and are magnetically coupled to each other. However, the first planar coil and the second planar coil are not electrically connected to each other and form coil structures which are separate from each other. Thus, as compared with a case in which the first planar coil and the second planar coil form one coil structure, the first planar coil and the second planar coil are less likely to affect each other's characteristics.

12 Claims, 5 Drawing Sheets

(56) References Cited

U.S. PATENT DOCUMENTS

| | | | | |
|---|---|---|---|---|
| 2014/0292466 | A1 * | 10/2014 | Watanabe ............... | H01F 27/29 205/118 |
| 2015/0145629 | A1 * | 5/2015 | Chang .................. | H01F 27/292 336/192 |
| 2015/0318104 | A1 * | 11/2015 | Chang ...................... | H03H 7/09 336/200 |
| 2016/0155556 | A1 | 6/2016 | Ohkubo et al. | |
| 2017/0148560 | A1 * | 5/2017 | Yoon ..................... | H01F 27/292 |
| 2017/0372833 | A1 | 12/2017 | Jang et al. | |
| 2018/0350499 | A1 * | 12/2018 | Matsuura ............... | H01G 4/232 |
| 2019/0013141 | A1 | 1/2019 | Yoon et al. | |
| 2019/0035534 | A1 | 1/2019 | Suzuki et al. | |
| 2019/0385792 | A1 | 12/2019 | Ohkubo et al. | |
| 2021/0225588 | A1 | 7/2021 | Ohkubo et al. | |

FOREIGN PATENT DOCUMENTS

| | | | | |
|---|---|---|---|---|
| JP | 2012-049696 | A | * | 3/2012 |
| JP | 2017-228764 | A | | 12/2017 |
| JP | 2019-016767 | A | | 1/2019 |
| JP | 2019-29479 | A | | 2/2019 |

* cited by examiner

COIL COMPONENT

CROSS-REFERENCE TO RELATED APPLICATIONS

This application is based upon and claims the benefit of priority from Japanese Patent Application No. 2019-218754, filed on 3 Dec. 2019, the entire contents of which are incorporated herein by reference.

TECHNICAL FIELD

The present disclosure relates to a coil component.

BACKGROUND

United States Patent Publication No. 2017-148560 (Patent Literature 1) discloses a coil component having two sets of coil structures formed by a pair of planar coils provided on both surfaces of a substrate. In the coil component of the literature, the inner end portions of the pair of planar coils are electrically connected to each other by a through conductor provided on the substrate.

SUMMARY

The inventors have conducted research on magnetic coupling between two coil structures included in a coil component and have found a new technique which can easily adjust the magnetic coupling.

According to the disclosure, a coil component in which magnetic coupling can be easily adjusted is provided.

A coil component according to an aspect of the disclosure includes an elementary body having a mounting surface corresponding to a mounting substrate; a first pair of external terminal electrodes and a second pair of external terminal electrodes provided on the mounting surface; an insulating substrate provided in the elementary body, the insulating substrate extending parallel to the mounting surface; a first planar coil provided on a first main surface of the insulating substrate on a side further from the mounting surface; a second planar coil provided on a second main surface of the insulating substrate on a side closer to the mounting surface and wound around the same magnetic core as a magnetic core of the first planar coil; a first pair of connecting conductors extending inside the insulating substrate and the elementary body in a direction orthogonal to the mounting surface and respectively connecting both end portions of the first planar coil to the first pair of external terminal electrodes; and a second pair of connecting conductors extending inside the elementary body in the direction orthogonal to the mounting surface and respectively connecting both end portions of the second planar coil to the second pair of external terminal electrodes.

In the coil component, the first planar coil and the second planar coil are magnetically coupled to each other but form coil structures which are separate from each other. Thus, as compared with a case in which the first planar coil and the second planar coil are electrically connected to each other and form one coil structure, the first planar coil and the second planar coil are less likely to affect each other's characteristics. Therefore, magnetic coupling between the first planar coil and the second planar coil can be easily adjusted by adjusting a thickness of the insulating substrate while an influence on each other's characteristics between the first planar coil and the second planar coil is curbed.

In the coil component according to another aspect of the disclosure, a height of the first planar coil and a height of the second planar coil in the direction orthogonal to the mounting surface may be different from each other.

In the coil component according to another aspect of the disclosure, a pair of through holes through pierced by the first pair of connecting conductors may be provided in the insulating substrate.

In the coil component according to another aspect of the disclosure, at least one of the first pair of connecting conductors may pass through an inside of the second planar coil.

In the coil component according to another aspect of the disclosure, a pattern shape of the first planar coil and a pattern shape of the second planar coil may be symmetrical.

DETAILED DESCRIPTION

Figure 1:
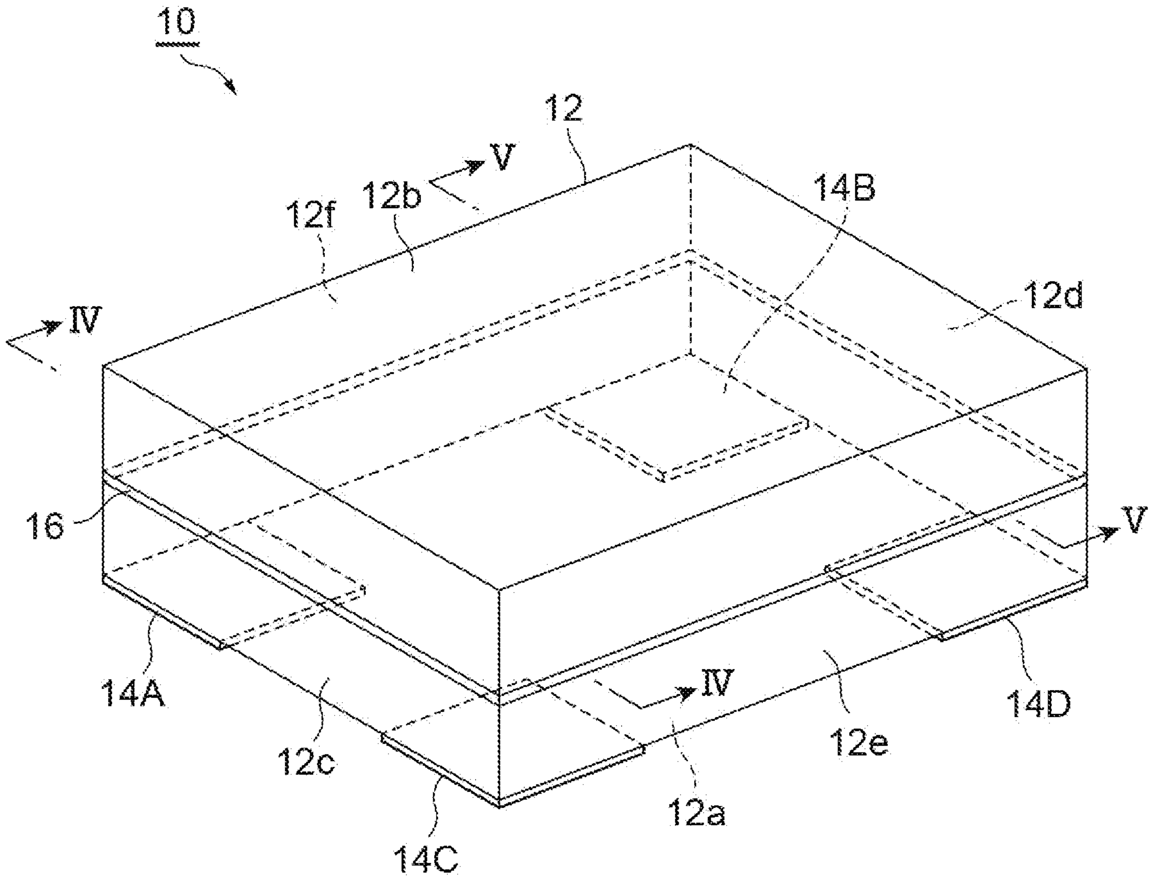
FIG. 1 is a schematic perspective view of a coil component according to an embodiment.

Hereinafter, embodiments of the disclosure will be described in detail with reference to the accompanying drawings. In the description, the same reference numerals are used for the same elements or elements having the same function, and duplicate description thereof will be omitted.

As shown in FIG. 1, the coil component 10 is configured of a main body 12 (an elementary body) having a rectangular parallelepiped shape, and two pairs of external terminal electrodes 14A, 14B, 14C, and 14D provided on a surface of the main body 12. The main body 12 has a bottom surface 12*a* (a mounting surface) which faces a mounting substrate, a top surface 12*b*, a pair of end surfaces 12*c* and 12*d*, and a pair of side surfaces 12*e* and 12*f*. The two pairs of external terminal electrodes 14A, 14B, 14C, and 14D are all provided on the bottom surface 12*a* of the main body 12. As an example, the coil component 10 is designed with dimensions of a long side of 2.5 mm, a short side of 2.0 mm, and a height of 0.8 to 1.0 mm.

Figure 2:
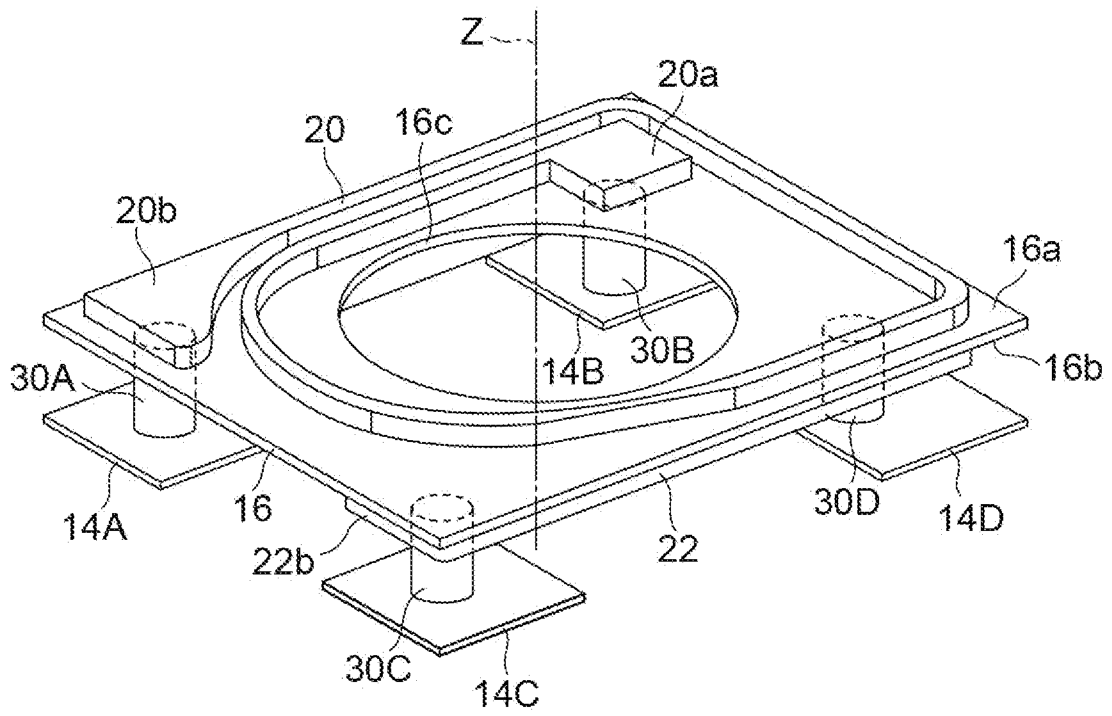
FIG. 2 is a view showing a first planar coil of the coil component of FIG. 1.

As shown in FIG. 2, the main body 12 includes an insulating substrate 16, a pair of planar coils 20 and 22 provided on both surfaces of the insulating substrate 16, and two pairs of connecting conductors 30A, 30B, 30C, and 30D which connect the planar coils 20 and 22 to the external terminal electrodes 14A, 14B, 14C, and 14D.

The insulating substrate 16 is a plate-shaped member having a rectangular shape provided inside the main body 12, and is made of a non-magnetic insulating material. The insulating substrate 16 extends parallel to the bottom surface 12*a* of the main body 12. An elliptical through hole 16*c* is provided in a central portion of the insulating substrate 16. A substrate in which a glass cloth is impregnated with an epoxy resin and which has a plate thickness of 40 μm to 100 μm can be used as the insulating substrate 16. In the embodiment, a thickness h of the insulating substrate 16 is 60 μm. In addition to an epoxy resin, a BT resin, polyimide, aramid and the like can also be used. Ceramic or glass can also be used as a material of the insulating substrate 16. The material of the insulating substrate 16 may be a mass-produced printed circuit board material, and may be a resin material, in particular, one used for a BT printed circuit board, a FR4 printed circuit board, or an FR5 printed circuit board.

The first planar coil 20 is a coil pattern having a planar spiral shape and provided on an upper surface 16*a* of the insulating substrate 16 (a first main surface farther from the bottom surface 12*a*). The first planar coil 20 has a predetermined height H1 based on the insulating substrate 16. The number of turns of the first planar coil 20 is about one turn, and both end portions 20*a* and 20*b* are located at two of four corners of the insulating substrate 16.

The second planar coil 22 is a coil pattern having a planar spiral shape and provided on a lower surface 16*b* of the insulating substrate 16 (a second main surface closer to the bottom surface 12*a*). The second planar coil 22 has a predetermined height H2 based on the insulating substrate 16. In the embodiment, the height H2 of the second planar coil 22 is designed to be the same as the height H1 of the first planar coil 20. A pattern shape of the second planar coil 22 is designed to be symmetrical with a pattern shape of the first planar coil 20. Specifically, the pattern shape of the first planar coil 20 and the pattern shape of the second planar coil 22 have a line-symmetrical relationship when seen from the upper surface 16*a* side of the insulating substrate 16. The number of turns of the second planar coil 22 is about one, like the first planar coil 20. Both end portions 22*a* and 22*b* of the second planar coil 22 are located at two of the four corners of the insulating substrate 16 at which the end portions 20*a* and 20*b* of the first planar coil 20 are not formed.

The first planar coil 20 and the second planar coil 22 can be formed by plating.

Side surfaces of the first planar coil 20 and the second planar coil 22 (that is, surfaces orthogonal to the insulating substrate 16) are covered with a resin wall 24. The resin wall 24 is made of an insulating resin material. The resin wall 24 can be provided on the insulating substrate 16 before the first planar coil 20 and the second planar coil 22 are formed, and in this case, the first planar coil 20 and the second planar coil 22 are plated and grown between walls defined in the resin walls 24. That is, formation regions of the first planar coil 20 and the second planar coil 22 are defined by the resin walls 24 provided on the insulating substrate 16. The resin walls 24 can be provided on the insulating substrate 16 after the first planar coil 20 and the second planar coil 22 are formed, and in this case, the resin walls 24 are provided on the first planar coil 20 and the second planar coil 22 by filling, coating, or the like.

An upper surface of the first planar coil 20 and a lower surface of the second planar coil 22 are covered with a protective film 25 having an insulating property. The protective film 25 is made of a resin such as an epoxy resin or a polyimide resin, and is formed using a photolithography method.

A magnetic body 26 integrally covers the insulating substrate 16, the first planar coil 20, and the second planar coil 22. More specifically, the magnetic body 26 covers the insulating substrate 16, the first planar coil 20, and the second planar coil 22 in a vertical direction (that is, a thickness direction of the insulating substrate 16), and covers the outer periphery of the insulating substrate 16, the first planar coil 20, and the second planar coil 22. Further, the magnetic body 26 fills the inside of the through hole 16*c* of the insulating substrate 16 and also fills inner regions of the first planar coil 20 and the second planar coil 22. In the magnetic body 26, a portion of the magnetic body 26 which fills the inside of the through hole 16*c* of the insulating substrate 16 and the inner regions of the planar coils 20 and 22 constitutes a magnetic core Z of the planar coils 20 and 22.

The magnetic body 26 is made of a metal magnetic component-containing resin. The metal magnetic component-containing resin is a binder powder in which metal magnetic powder is bound by a binder resin. The metal magnetic powder of the metal magnetic component-containing resin constituting the magnetic body 26 is configured of, for example, an iron-nickel alloy (a Permalloy alloy), carbonyl iron, an amorphous or crystalline FeSiCr-based alloy, Sendust, or the like. The binder resin is, for example, a thermosetting epoxy resin. In the embodiment, a content of the metallic magnetic powder in the binder powder is 80 to 92 vol % in percentage by volume and 95 to 99 wt % in percentage by mass. From the viewpoint of magnetic properties, the content of the metal magnetic powder in the binder powder may be 85 to 92 vol % in percentage by volume and 97 to 99 wt % in percentage by mass. The magnetic component of the metal magnetic component-containing resin constituting the magnetic body 26 may be a powder having one kind of average particle diameter, or may be a mixed powder having a plurality of kinds of average particle diameter. In the embodiment, the magnetic component of the metal magnetic component-containing resin constituting the magnetic body 26 is a mixed powder having three kinds of average particle diameter. When the magnetic component of the metal magnetic component-containing resin constituting the magnetic body 26 is a mixed powder, the kinds of magnetic components having different average particle diameters may be the same as or different from each other.

As shown in FIGS. 2 to 5, each of the two pairs of connecting conductors 30A, 30B, 30C, and 30D extends in a direction orthogonal to the insulating substrate 16 (that is, a normal direction of the bottom surface 12*a*). Each of the connecting conductors 30A, 30B, 30C, and 30D has a substantially cylindrical exterior.

Among the two pairs of connecting conductors 30A, 30B, 30C and 30D, the first pair of connecting conductors 30A and 30B reach from both end portions 20*a* and 20*b* of the first planar coil 20 to the bottom surface 12*a* and are exposed from the bottom surface 12*a*. Among the two pairs of connecting conductors 30A, 30B, 30C and 30D, the second pair of connecting conductors 30C and 30D reach from both end portions 22*a* and 22*b* of the second planar coil 22 to the bottom surface 12*a* and are exposed from the bottom surface 12*a*. Each of the connecting conductors 30A, 30B, 30C and 30D can be formed by a plating method.

Figure 3:
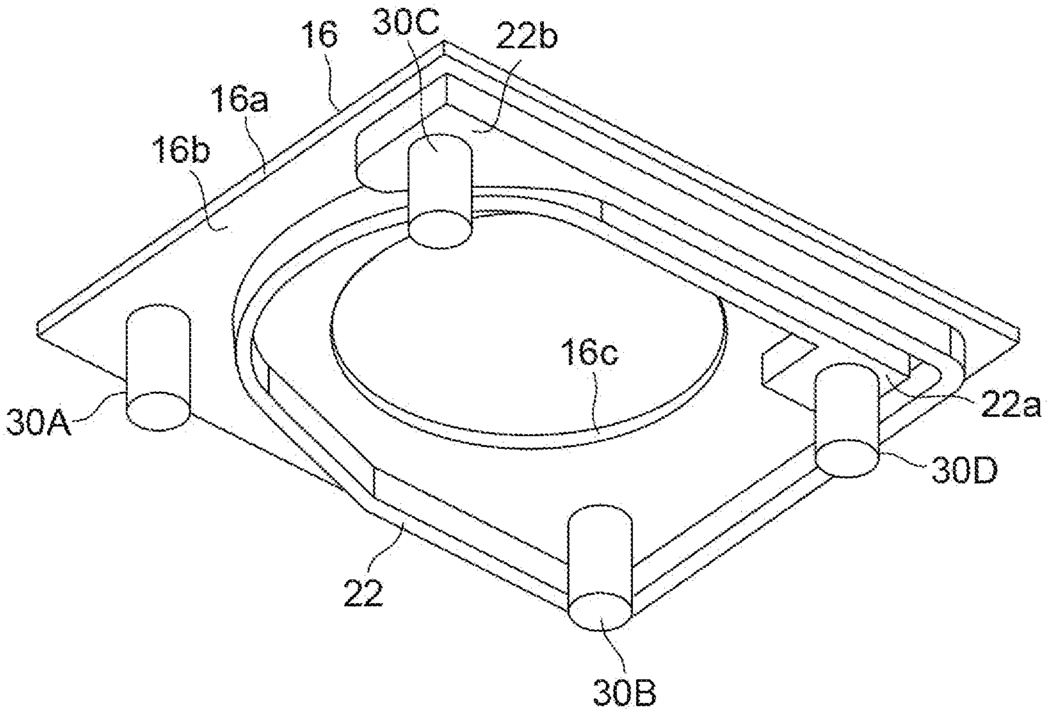
FIG. 3 is a view showing a second planar coil of the coil component of FIG. 1.
Figure 4:
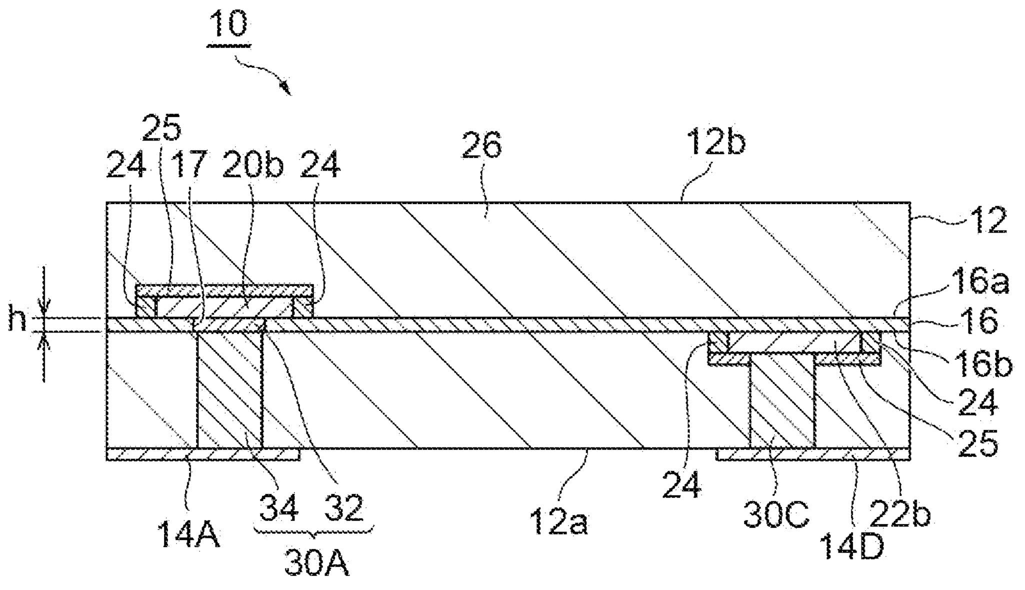
FIG. 4 is a cross-sectional view taken along IV-IV of the coil component shown in FIG. 1.
Figure 5:
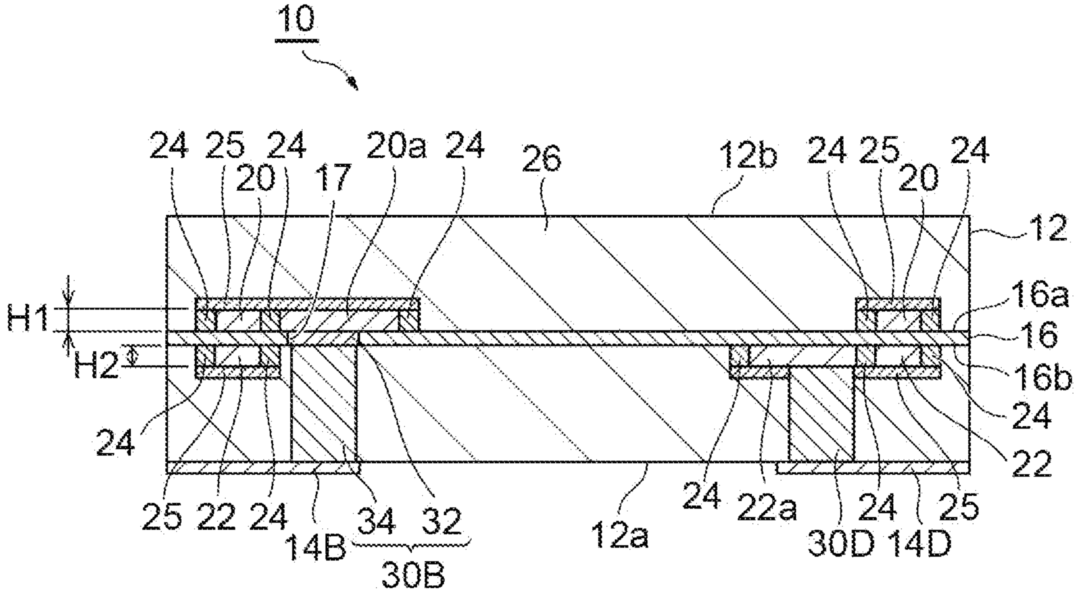
FIG. 5 is a cross-sectional view taken along V-V of the coil component shown in FIG. 1.

Each of the first pair of connecting conductors 30A and 30B includes a first conductor 32 piercing the insulating substrate 16 and a second conductor 34 piercing the magnetic body 26. The first conductor 32 is provided to fill a through hole 17 provided in the insulating substrate 16, and an upper end thereof is in contact with the end portions 20*a* and 20*b* of the first planar coil 20. That is, a pair of through holes 17 through which the connecting conductors 30A and 30B pass are provided in the insulating substrate 16. As shown in FIGS. 2 and 3, the connecting conductor 30A passes through the outside of the second planar coil 22 and extends from the outer end portion 20*b* of the first planar coil 20 to the bottom surface 12*a*. As shown in FIGS. 2 and 3, the connecting conductor 30B passes through the inside of the second planar coil 22 and extends from the inner end portion 20*a* of the first planar coil 20 to the bottom surface 12*a*.

The second pair of connecting conductors 30C and 30D extend from both end portions 22*a* and 22*b* of the second planar coil 22 to the bottom surface 12*a* through the inside of the magnetic body 26. The connecting conductor 30C extends from the outer end portion 22*b* of the second planar coil 22 to the bottom surface 12*a*. The connecting conductor 30D extends from the inner end portion 22*a* of the second planar coil 22 to the bottom surface 12*a*.

The two pairs of external terminal electrodes 14A, 14B, 14C, and 14D provided on the bottom surface 12*a* of the main body 12 are formed at the four corners of the bottom surface 12*a* having a rectangular shape. Among the two pairs of external terminal electrodes 14A, 14B, 14C, and 14D, the first pair of external terminal electrodes 14A and 14B are connected to the first pair of connecting conductors 30A and 30B. More specifically, the external terminal electrode 14A is formed at a corner at which the connecting conductor 30A is exposed, and is connected to the outer end portion 20*b* of the first planar coil 20. The external terminal electrode 14B is formed at a corner at which the connecting conductor 30B is exposed, and is connected to the inner end portion 20*a* of the first planar coil 20. Among the two pairs of external terminal electrodes 14A, 14B, 14C, and 14D, the second pair of external terminal electrodes 14C and 14D are connected to the second pair of connecting conductors 30C and 30D. More specifically, the external terminal electrode 14C is formed in a corner at which the connecting conductor 30C is exposed, and is connected to the outer end portion 22*b* of the second planar coil 22. The external terminal electrode 14D is formed at a corner at which the connecting conductor 30D is exposed, and is connected to the inner end portion 22*a* of the second planar coil 22.

In the above-described coil component 10, the first planar coil 20 and the second planar coil are wound around a common magnetic core Z and are magnetically coupled to each other. However, the first planar coil 20 and the second planar coil are not electrically connected to each other and form coil structures which are separate from each other. Thus, as compared with a case in which the first planar coil 20 and the second planar coil 22 form one coil structure, the first planar coil 20 and the second planar coil 22 are less likely to affect each other's characteristics.

Therefore, each of the first planar coil 20 and the second planar coil 22 can be freely designed to some extent while the influence on the characteristics of the other planar coil is curbed. For example, since a coupling coefficient between the first planar coil 20 and the second planar coil 22 depends on a thickness h of the insulating substrate 16, magnetic coupling between the first planar coil 20 and the second planar coil 22 can be easily adjusted by adjusting the thickness h. Further, in the first planar coil 20 and the second planar coil 22, since it is not necessary to align the inner end portions 20*a* and 22*a* with each other, a degree of freedom in designing the pattern shape and the number of turns is increased. Further, the first planar coil 20 and the second planar coil 22 have an increased degree of freedom in design with respect to a height dimension. Therefore, a magnitude relationship and a height difference between the height H1 of the first planar coil 20 and the height H2 of the second planar coil 22 can be appropriately adjusted. For example, the height H1 of the first planar coil 20 and the height H2 of the second planar coil 22 may be the same as each other as in the above-described embodiment, or may be different from each other.

Further, in the coil component 10, the connecting conductor 30B connected to the inner end portion 20*a* of the first planar coil 20 passes through the inside of the second planar coil 22. As described above, when one or both of the first pair of connecting conductors 30A and 30B pass through the inside of the second planar coil 22, a coil length can be increased, and an inductance value can be increased.

The disclosure is not limited to the above-described embodiment, and may take various aspects.

For example, the first coil and the second coil do not have to be line symmetric. Further, the number of turns of the first coil and the number of turns of the second coil can be increased or decreased as appropriate.

What is claimed is:

1. A coil component comprising:

an elementary body having a mounting surface corresponding to a mounting substrate;

a first pair of external terminal electrodes and a second pair of external terminal electrodes provided on the mounting surface;

an insulating substrate provided in the elementary body, the insulating substrate extending parallel to the mounting surface;

a first planar coil provided on a first main surface of the insulating substrate on a side further from the mounting surface, the first planar coil having a single-layer structure, an inner end portion located on an inner peripheral side of the first planar coil, and an outer end portion located on an outer peripheral side of the first planar coil;

a second planar coil provided on a second main surface of the insulating substrate on a side closer to the mounting surface and wound around the same magnetic core as a magnetic core of the first planar coil, the second planar coil having a single-layer structure, an inner end portion located on an inner peripheral side of the second planar coil, and an outer end portion located on an outer peripheral side of the second planar coil;

a first pair of connecting conductors extending inside the insulating substrate and the elementary body in a direction orthogonal to the mounting surface and respectively connecting the inner end portion and the outer end portion of the first planar coil to the first pair of external terminal electrodes, each of the first pair of connecting conductors, as a whole, extending in the direction orthogonal to the mounting surface without having a layer that is parallel to the mounting surface, the first pair of connecting conductors including a first inner connecting conductor and a first outer connecting conductor, the first pair of external terminal electrodes including a first inner external terminal electrode and a first outer external terminal electrode, the first inner connecting conductor connecting the inner end portion of the first planar coil to the first inner external terminal electrode, the first outer connecting conductor connecting the outer end portion of the first planar coil to the first outer external terminal electrode; and a second pair of connecting conductors extending inside the elementary body in the direction orthogonal to the mounting surface and respectively connecting the inner end portion and the outer end portion of the second planar coil to the second pair of external terminal electrodes, each of the second pair of connecting conductors, as a whole, extending in the direction orthogonal to the mounting surface without having a layer that is parallel to the mounting surface, the second pair of connecting conductors including a second inner connecting conductor and a second outer connecting conductor, the second pair of external terminal electrodes including a second inner external terminal electrode and a second outer external terminal electrode, the second inner connecting conductor connecting the inner end portion of the second planar coil to the second inner external terminal electrode, the second outer connecting conductor connecting the outer end portion of the second planar coil to the second outer external terminal electrode, wherein the elementary body includes a magnetic body covering the first main surface of the insulating substrate along with the first planar coil provided thereon and the second main surface of the insulating substrate along with the second planar coil provided thereon, wherein, when viewed in the direction perpendicular to the mounting surface, one of the first pair of connecting conductors connected to the inner end portion of the first planar coil is located inside the second planar coil and one of the second pair of connecting conductors connected to the inner end portion of the second planar coil is located inside the first planar coil, wherein the insulating substrate is provided with a pair of through holes through which the first pair of connecting conductors penetrate, and wherein, when viewed in the direction perpendicular to the mounting surface, the inner end portion of the first planar coil and the first inner external terminal electrode overlap and form a first overlapping region, the inner end portion of the second planar coil and the second inner external terminal electrode overlap and form a second overlapping region, the first inner connecting conductor is located in the first overlapping region, and the second inner connecting conductor is located in the second overlapping region.

2. The coil component according to claim 1, wherein a height of the first planar coil and a height of the second planar coil in the direction orthogonal to the mounting surface are different from each other.

3. The coil component according to claim 1, wherein a pair of through holes pierced by the first pair of connecting conductors are provided in the insulating substrate.

4. The coil component according to claim 1, wherein at least one of the first pair of connecting conductors passes through an inside of the second planar coil.

5. The coil component according to claim 1, wherein a pattern shape of the first planar coil and a pattern shape of the second planar coil are symmetrical.

6. The coil component according to claim 1, wherein the elementary body is made of a material that differs from a material of which the insulating substrate is made.

7. The coil component according to claim 1, wherein each of the first external terminals and each of the second external terminals is provided only on the mounting surface.

8. The coil component according to claim 1, wherein each of the first pair of connecting conductors and each of the second pair of connecting conductors extends toward the mounting surface of the element body.

9. The coil component according to claim 1, wherein each of the first pair of connecting conductors is in direct contact with the inner end portion or the outer end portion of the first planar coil, and each of the second pair of connecting conductors is in direct contact with the inner end portion or the outer end portion of the second planar coil.

10. The coil component according to claim 1, wherein the magnetic body is made of a metal magnetic component-containing resin.

11. The coil component according to claim 1, wherein the magnetic body is in direct contact with the first main surface and the second main surface of the insulating substrate.

12. A coil component comprising:

an elementary body having a mounting surface corresponding to a mounting substrate;

a first pair of external terminal electrodes and a second pair of external terminal electrodes provided on the mounting surface;

an insulating substrate provided in the elementary body, the insulating substrate extending parallel to the mounting surface;

a first planar coil provided on a first main surface of the insulating substrate on a side further from the mounting surface, the first planar coil having a single-layer structure, an inner end portion located on an inner peripheral side of the first planar coil, and an outer end portion located on an outer peripheral side of the first planar coil;

a second planar coil provided on a second main surface of the insulating substrate on a side closer to the mounting surface and wound around the same magnetic core as a magnetic core of the first planar coil, the second planar coil having a single-layer structure, an inner end portion located on an inner peripheral side of the second planar coil, and an outer end portion located on an outer peripheral side of the second planar coil;

a first pair of connecting conductors extending inside the insulating substrate and the elementary body in a direction orthogonal to the mounting surface and respectively connecting the inner end portion and the outer end portion of the first planar coil to the first pair of external terminal electrodes, each of the first pair of connecting conductors, as a whole, extending in the direction orthogonal to the mounting surface without having a layer that is parallel to the mounting surface, the first pair of connecting conductors including a first inner connecting conductor and a first outer connecting conductor, the first pair of external terminal electrodes including a first inner external terminal electrode and a first outer external terminal electrode, the first inner connecting conductor connecting the inner end portion of the first planar coil to the first inner external terminal electrode, the first outer connecting conductor connecting the outer end portion of the first planar coil to the first outer external terminal electrode; and a second pair of connecting conductors extending inside the elementary body in the direction orthogonal to the mounting surface and respectively connecting the inner end portion and the outer end portion of the second planar coil to the second pair of external terminal electrodes, each of the second pair of connecting conductors, as a whole, extending in the direction orthogonal to the mounting surface without having a layer that is parallel to the mounting surface, the second pair of connecting conductors including a second inner connecting conductor and a second outer connecting conductor, the second pair of external terminal electrodes including a second inner external terminal electrode and a second outer external terminal electrode, the second inner connecting conductor connecting the inner end portion of the second planar coil to the second inner external terminal electrode, the second outer connecting conductor connecting the outer end portion of the second planar coil to the second outer external terminal electrode, wherein the elementary body includes a magnetic body covering the first main surface of the insulating substrate along with the first planar coil provided thereon and the second main surface of the insulating substrate along with the second planar coil provided thereon, wherein, when viewed in the direction perpendicular to the mounting surface, one of the first pair of connecting conductors connected to the inner end portion of the first planar coil is located inside the second planar coil and one of the second pair of connecting conductors connected to the inner end portion of the second planar coil is located inside the first planar coil, wherein the insulating substrate is provided with a pair of through holes through which the first pair of connecting conductors penetrate, and wherein, when viewed in the direction perpendicular to the mounting surface, the inner end portion of the first planar coil, the first inner connecting conductor and the first inner external terminal electrode overlap, and the inner end portion of the second planar coil, the second inner connecting conductor and the second inner external terminal electrode overlap.

* * * * *